US010079974B2

(12) United States Patent
Tojo et al.

(10) Patent No.: US 10,079,974 B2
(45) Date of Patent: Sep. 18, 2018

(54) IMAGE PROCESSING APPARATUS, METHOD, AND MEDIUM FOR EXTRACTING FEATURE AMOUNT OF IMAGE

(71) Applicant: CANON KABUSHIKI KAISHA, Tokyo (JP)

(72) Inventors: Hiroshi Tojo, Fuchu (JP); Kotaro Yano, Tokyo (JP)

(73) Assignee: CANON KABUSHIKI KAISHA, Tokyo (JP)

(*) Notice: Subject to any disclaimer, the term of this patent is extended or adjusted under 35 U.S.C. 154(b) by 16 days.

(21) Appl. No.: 15/292,691

(22) Filed: Oct. 13, 2016

(65) Prior Publication Data
US 2017/0111576 A1 Apr. 20, 2017

(30) Foreign Application Priority Data
Oct. 15, 2015 (JP) ................. 2015-204049

(51) Int. Cl.
H04N 5/222 (2006.01)
H04N 5/232 (2006.01)
(Continued)

(52) U.S. Cl.
CPC ..... *H04N 5/23229* (2013.01); *G06K 9/00744* (2013.01); *G06K 9/00771* (2013.01);
(Continued)

(58) Field of Classification Search
CPC ........... H04N 5/23229; H04N 5/23238; G06K 9/00771; G06K 9/6857; G06K 9/00744;
(Continued)

(56) References Cited

U.S. PATENT DOCUMENTS 7,806,604 B2 * 10/2010 Bazakos ............ G06K 9/00255
348/153
2001/0019357 A1 * 9/2001 Ito ..................... G08B 13/19604
348/152
(Continued)

FOREIGN PATENT DOCUMENTS

JP 2003-219225 A 7/2003

OTHER PUBLICATIONS

Chris Stauffer et al., "Adaptive background mixture models for real-time tracking", In Proceedings of 1999 IEEE Computer Society Conference on Computer Vision and Pattern Recognition (Cat. No. PR00149), IEEE Comput. Soc. Part vol. 2, 7 pages.
(Continued)

*Primary Examiner* — Lin Ye
*Assistant Examiner* — John H Morehead, III
(74) *Attorney, Agent, or Firm* — Canon U.S.A., Inc. IP Division

(57) ABSTRACT

An image processing apparatus includes an imaging unit configured to capture an image, an extraction unit configured to extract a feature amount in each image region of a plurality of objects from the captured image, a determination unit configured to determine, based on the extracted feature amount, a type of a feature amount used for discriminating each of the plurality of objects and a resolution of an image used for extracting a feature amount of the determined type, an imaging control unit configured to control the imaging unit to output an image at the determined resolution, and an extraction control unit configured to control the extraction unit to extract a feature amount of the determined type from the image output at the determined resolution from the imaging unit.

12 Claims, 9 Drawing Sheets

(51) Int. Cl.
*G06K 9/46* (2006.01)
*G06K 9/62* (2006.01)
*G06T 3/40* (2006.01)
*G06K 9/00* (2006.01)
*G06K 9/68* (2006.01)
*H04N 5/247* (2006.01)

(52) U.S. Cl.
CPC ......... *G06K 9/4671* (2013.01); *G06K 9/6218* (2013.01); *G06K 9/6267* (2013.01); *G06K 9/6857* (2013.01); *G06T 3/40* (2013.01); *H04N 5/23219* (2013.01); *H04N 5/23238* (2013.01); *H04N 5/23296* (2013.01); *H04N 5/247* (2013.01); *G06K 2009/4666* (2013.01); *G06T 2207/20112* (2013.01)

(58) Field of Classification Search
CPC .. G06K 9/6218; G06K 9/6267; G06K 9/4671; G06K 2009/4666; G06T 3/40; G06T 2207/20112
See application file for complete search history.

(56) References Cited

U.S. PATENT DOCUMENTS

| | | | | |
|---|---|---|---|---|
| 2005/0104958 | A1* | 5/2005 | Egnal | G01S 3/7864 348/143 |
| 2006/0028548 | A1* | 2/2006 | Salivar | G08B 13/19643 348/143 |
| 2006/0175549 | A1* | 8/2006 | Miller | G08B 13/19643 250/334 |
| 2007/0237387 | A1 | 10/2007 | Avidan | |
| 2008/0107311 | A1* | 5/2008 | Huang | G06K 9/00288 382/118 |
| 2008/0304749 | A1* | 12/2008 | Ogawa | G06K 9/00268 382/190 |
| 2011/0019989 | A1* | 1/2011 | Tanaka | H04N 5/23212 396/104 |
| 2011/0043628 | A1* | 2/2011 | Yun | G01S 3/7865 348/143 |
| 2011/0228092 | A1* | 9/2011 | Park | G06K 9/00771 348/154 |
| 2012/0045095 | A1* | 2/2012 | Tate | G06T 5/003 382/103 |
| 2014/0104376 | A1* | 4/2014 | Chen | G08B 13/19689 348/36 |
| 2015/0278997 | A1* | 10/2015 | Kim | G06K 9/00281 382/195 |
| 2015/0334299 | A1* | 11/2015 | Tsuneno | G06K 9/00288 348/36 |
| 2016/0127657 | A1* | 5/2016 | Mukai | H04N 7/181 348/38 |

OTHER PUBLICATIONS

Dorin Comaniciu et al., "Mean Shift: A Robust Approach Toward Feature Space Analysis", PAMI, 24(5): 603-619, IEEE vol. 24, No. 5 May 2002, pp. 603-619.

Sean Borman et al., "Super-Resolution from Image Sequences—A Review", Circuits and Systems, 1998, 5 pages.

Jianchao Yang et al., "Image Super-Resolution as Sparse Representation of Raw Image Patches", Computer Vision and Pattern Recognition, 2008, 8 pages.

* cited by examiner

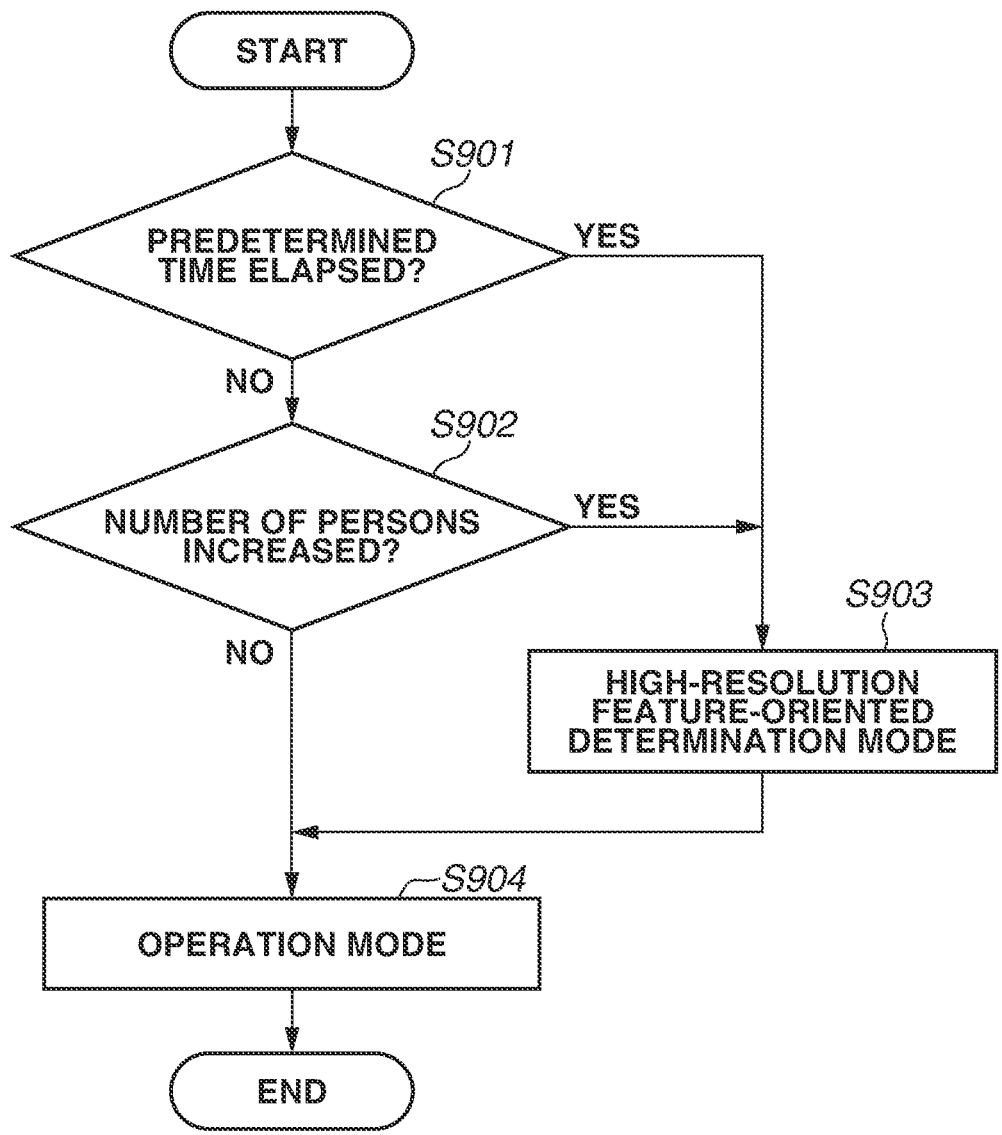

IMAGE PROCESSING APPARATUS, METHOD, AND MEDIUM FOR EXTRACTING FEATURE AMOUNT OF IMAGE

BACKGROUND OF THE INVENTION

Field of the Invention

Aspects of the present disclosure generally relate to image processing and, more particularly, to an image processing apparatus, method, and medium for extracting a feature amount of an image.

Description of the Related Art

Heretofore, a technique has been developed to enable searching for an image of a predetermined object in a recorded moving image and performing playback of a recording period during which the object was subjected to image capturing. To implement this searching and playback, the technique detects an object region at the time of image capturing with a camera, extracts a feature amount of an image from the object region, and stores the feature amount of the object region in association with a moving image. When searching for an image of a predetermined object from among the moving image, the technique searches for an image in which the object associated with the feature amount is shown from the moving image. To enable more accurate searching, a method of acquiring a high-resolution object image to be used to extract a feature amount is effective. In particular, in the field of monitoring cameras, a technique is known to provide, in addition to a camera used to monitor a wide area (wide angle), a camera capable of operating for panning, tilting, and zooming (hereinafter referred to as "PTZ") and to acquire a high-resolution image of each and every person serving as an object. For example, U.S. Patent Application Publication No. 2005/0104958 discusses a technique to perform zooming when detecting a person, perform tracking on the person with a camera until an image having a good image quality as determined by the degree of focusing or the amount of noise is obtained, and acquire a high-resolution image of the person region. Moreover, Japanese Patent Application Laid-Open No. 2003-219225 discusses a technique to detect a person as a moving object based on a background differencing method, detect a skin color region from the detected person region, perform zooming on the skin color region, and acquire a high-resolution image of the person's face.

However, in the case of an environment in which a large number of persons come and go, such as a convenience store, a shopping mall, and an airport, the number of persons to be targeted is too large to individually discriminate such a large number of persons. In such an environment, performing tracking until high-quality person images are obtained with respect to all of the persons, as in the technique discussed in U.S. Patent Application Publication No. 2005/0104958, or performing zooming on the faces of all of the persons, as in the technique discussed in Japanese Patent Application Laid-Open No. 2003-219225, causes a processing load to become very high. Furthermore, since, usually, the more high-resolution image, the more detailed feature amount (having a more amount of information) is extracted, the amount of data of the extracted feature amount becomes larger and the amount of memory to be consumed also increases. In addition, in the case of an environment such as an airport, since a single camera is not sufficient to cover all of the monitoring target area, a great number of cameras need to be installed. If every camera is used to acquire a high-resolution image of every individual person to extract a feature amount, the processing load and the overall amount of memory used for the entire system would become huge.

SUMMARY OF THE INVENTION

Aspects of the present disclosure are generally directed to providing an image processing apparatus, an image processing method, and a storage medium, which are capable of acquiring a feature amount effective in discriminating each object while preventing any increase in a processing load and a required overall amount of memory.

According to an aspect of the present disclosure, an image processing apparatus includes an imaging unit configured to capture an image, an extraction unit configured to extract a feature amount in each image region of a plurality of objects from the captured image, a determination unit configured to determine, based on the extracted feature amount, a type of a feature amount used for discriminating each of the plurality of objects and a resolution of an image used for extracting a feature amount of the determined type, an imaging control unit configured to control the imaging unit to output an image at the determined resolution, and an extraction control unit configured to control the extraction unit to extract a feature amount of the determined type from the image output at the determined resolution from the imaging unit.

Further features of the present disclosure will become apparent from the following description of exemplary embodiments with reference to the attached drawings.

BRIEF DESCRIPTION OF THE DRAWINGS

FIG. 9 is a flowchart illustrating the flow of switching between the high-resolution feature-oriented determination mode and the operation mode.

DESCRIPTION OF THE EMBODIMENTS

Various exemplary embodiments, features, and aspects of the disclosure will be described in detail below with reference to the drawings.

<Schematic Hardware Configuration>

Figure 1:
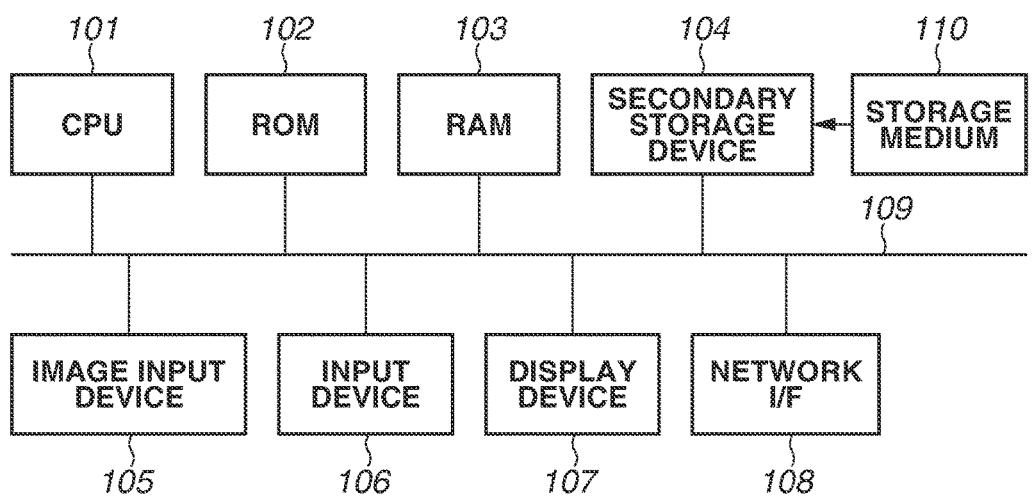
FIG. 1 illustrates a schematic hardware configuration example of an image processing apparatus according to an exemplary embodiment.

FIG. 1 illustrates a schematic hardware configuration example of an image processing apparatus according to an exemplary embodiment.

A central processing unit (CPU) 101, which may include one or more processors and one or more memories, executes instructions according to programs stored in a read-only memory (ROM) 102 and a random access memory (RAM) 103. Moreover, the CPU 101 controls, for example, an image input device 105, an input device 106, a display device 107, a secondary storage device 104, and a network interface (I/F) 108. Details of instruction execution processing and control over each unit performed by the CPU 101 are described below. As used herein, the term "unit" generally refers to hardware, firmware, software or other component, such as circuitry, alone or in combination thereof, that is used to effectuate a purpose.

The ROM 102, which is a non-volatile memory, stores the programs executed in the present exemplary embodiment and, for example, programs and data used for other control operations. The RAM 103, which is a volatile memory, temporarily stores, for example, each frame image data of a moving image captured by the image input device 105 or a moving image acquired via the network I/F 108 or the secondary storage device 104, and information about a result of discrimination of a feature amount, which is described below.

The secondary storage device 104 stores, for example, image data and other various pieces of information into a storage medium 110 of any type which is rewritable and computer-readable, such as a hard disk drive or a flash memory. Not only such image data and various pieces of information but also the programs executed in the present exemplary embodiment can be recorded on the storage medium 110. Moreover, the secondary storage device 104 transfers, for example, image data, various pieces of information, and programs to the RAM 103. With this, the CPU 101 executes the programs and uses the image data and various pieces of information.

The input device 106, which includes a keyboard, a mouse, or a touch panel, is a device that receives inputs from the user. The display device 107, which includes a liquid crystal display or an organic electroluminescence (EL) display panel, is a device that displays, for example, an image and a result of search processing, which is described below. The network I/F 108 is an interface device that is connectable to, for example, a modem, a local area network (LAN), or a wireless communication network, which is used to connect to a network, such as the Internet or an intranet. A bus 109 is used to interconnect the above-mentioned units to allow mutual inputting and outputting of data.

The image input device 105, which is, for example, a digital video camera, a network camera, or an infrared camera used as a monitoring camera, is a device that captures an image in a monitoring area, such as a convenience store, a shopping mall, or an airport. In the case of the present exemplary embodiment, the image input device 105 includes both a camera capable of performing wide-area (wide angle) image capturing over approximately the entire monitoring area and a camera capable of adjusting the imaging direction and angle of view, such as panning, tilting, and zooming (PTZ). Hereinafter, the camera capable of performing wide-area (wide angle) image capturing is referred to as a "wide-area imaging camera", and the camera capable of adjusting the imaging direction and angle of view, such as PTZ, is referred to as a "PTZ imaging camera". The PTZ imaging camera is capable of adjusting the imaging direction by panning and tilting, and is capable of adjusting the angle of view by changing the focal length (zoom magnification) of a zoom lens. The PTZ imaging camera is a camera not only capable of performing image capturing over the same shooting range (field of view) as the shooting range of the wide-area imaging camera but also capable of performing image capturing while magnifying (zooming up) only a part in the shooting range (in the field of view) of the wide-area imaging camera. In a case where the PTZ imaging camera is performing image capturing while zooming up a part in the shooting range (in the field of view) of the wide-area imaging camera, the image input device 105 is supposed to always recognize over which range in the shooting range of the wide-area imaging camera the PTZ imaging camera is performing image capturing. Furthermore, in the present exemplary embodiment, each of the wide-area imaging camera and the PTZ imaging camera does not need to be one in number, but can be plural in number. Moreover, the monitoring area also does not need to be one in number, but can be plural in number. In this case, at least one set of the wide-area imaging camera and the PTZ imaging camera is arranged for one monitoring area. In addition, wide-area image capturing and PTZ image capturing can be performed by, for example, a single camera in a time-sharing manner.

While, in FIG. 1, an example is illustrated in which the image input device 105 is connected via the bus 109, in a case where the image input device 105 is, for example, a network camera, the network camera is connected to the image processing apparatus via the network I/F 108. Moreover, similarly, for example, the input device 106, the display device 107, and the secondary storage device 104 can also be not only connected via the bus 109 but also connected via the network I/F 108.

<Object Feature Extraction Function and Object Search Function>

The image processing apparatus according to the present exemplary embodiment includes an object feature extraction function and an object search function. Hereinafter, in the image processing apparatus according to the present exemplary embodiment, the following description is made using an example in which the object feature extraction function and the object search function are installed as an application that runs on an operating system.

Figure 2:
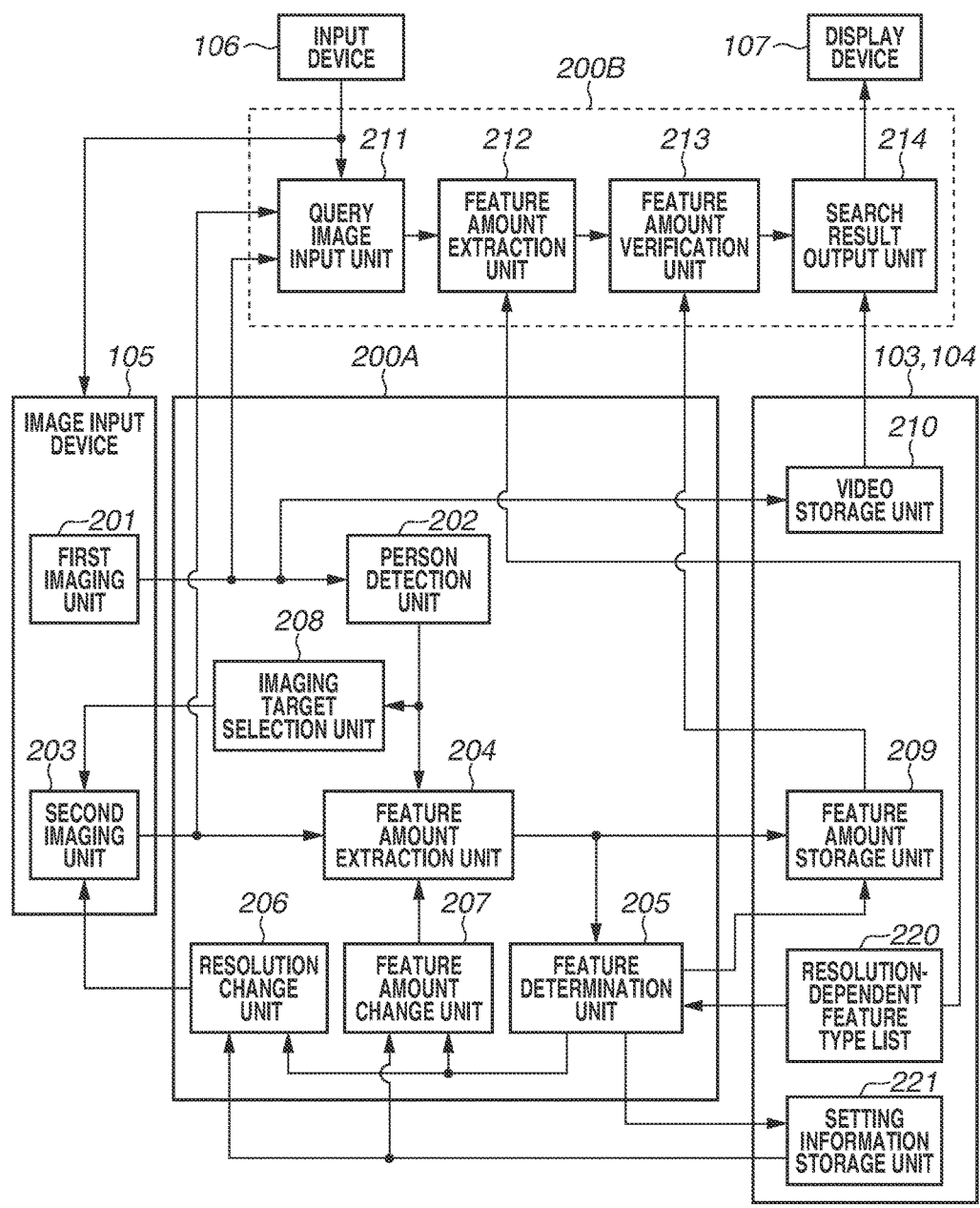
FIG. 2 illustrates a configuration example of various functional units of the image processing apparatus according to the exemplary embodiment.

FIG. 2 is a diagram illustrating, as function blocks, an object feature extraction function unit 200A and an object search function unit 200B, which are included in the image processing apparatus according to the present exemplary embodiment. Furthermore, in FIG. 2, for ease of description, the image input device 105, the input device 106, the display device 107, the RAM 103, and the secondary storage device 104 illustrated in FIG. 1 are also illustrated. Moreover, in FIG. 2, a first imaging unit 201 of the image input device 105 corresponds to the above-mentioned wide-area imaging camera, and a second imaging unit 203 thereof corresponds to the above-mentioned PTZ imaging camera.

The object feature extraction function unit 200A and the object search function unit 200B in the present exemplary embodiment are functional units that are implemented, for example, by the CPU 101 illustrated in FIG. 1 executing an application program stored in the ROM 102 or the storage medium 110 of the secondary storage device 104 illustrated in FIG. 1. The object feature extraction function unit 200A includes a person detection unit 202, a feature amount extraction unit 204, a feature determination unit 205, a resolution change unit 206, a feature amount change unit 207, and an imaging target selection unit 208. The object search function unit 200B includes a query image input unit 211, a feature amount extraction unit 212, a feature amount verification unit 213, and a search result output unit 214.

<Configuration of Object Feature Extraction Function Unit>

A schematic configuration of the object feature extraction function unit 200A is described below.

Data of a wide-area image captured as a moving image by the first imaging unit 201 of the image input device 105 is sent to the person detection unit 202 of the object feature extraction function unit 200A and to a video storage unit 210. The person detection unit 202 detects, for example, an image region of a person, as an object image serving as an object target, from among each frame image of the wide-area image captured by the first imaging unit 201. Hereinafter, the image region of a person is referred to as a "person region". Furthermore, in a case where a plurality of persons is present in the shooting range (field of view) of the first imaging unit 201, the person detection unit 202 detects a plurality of person regions respectively corresponding to the plurality of persons from a wide-area image captured by the first imaging unit 201. Details of detection processing of each person region performed by the person detection unit 202 are described below. The person detection unit 202 sends information indicating the position of each person region and the range of each person region in the wide-area image, together with an identifier for identifying each person region (person ID), to the imaging target selection unit 208 and the feature amount extraction unit 204. Moreover, the same person shown in a video is assigned the same number as the person ID. A person region detected at a position close to that shown in the preceding frame is assumed to be the same person, and is thus assigned the same person ID. If the detected person region is not at a position close to that shown in the preceding frame, a new person is assumed to appear and, thus, a new person ID is issued.

The imaging target selection unit 208 sets the direction of a lens of the camera of the second imaging unit 203 in such a manner that an image of the object (person) of the person region detected by the person detection unit 202 is captured at approximately the center of an image plane (shooting range) of the second imaging unit 203. With this, at the second imaging unit 203 of the image input device 105, an image in which the object (person) of the person region detected by the person detection unit 202 is shown at approximately the center thereof is acquired. Furthermore, in a case where a plurality of person regions has been detected from a wide-area image, the imaging target selection unit 208 selects the person regions in order, and sequentially sets the direction of the lens in such a manner that images of the respective persons corresponding to the person regions selected in order are shown in order at approximately the center of the image plane of the second imaging unit 203. Details of selection of person regions by the imaging target selection unit 208 and setting of the second imaging unit 203 in a case where a plurality of person regions has been detected from a wide-area image are described below. Here, for ease of description, a case where only one person region is selected is described as an example. Each frame image data of a moving image captured by the second imaging unit 203 is sent to the feature amount extraction unit 204.

The feature amount extraction unit 204 extracts a feature amount of an image of the person region from each frame data of the moving image captured by the second imaging unit 203. Although details are described below, for example, the feature amount extraction unit 204 is configured to be capable of appropriately extracting, as needed, various types of feature amounts, such as the size, color, and texture of the person region and the shapes and positions of the respective part regions in the face region of the person region. Details of processing performed by the feature amount extraction unit 204 to appropriately extract, as needed, various types of feature amounts, such as the size, color, and texture of the person region and the shapes and positions of the respective part regions in the face region of the person region are described below. Information on the feature amount extracted from the person region by the feature amount extraction unit 204 is caused to be associated with the above-mentioned person ID and is then sent to a feature amount storage unit 209 and the feature determination unit 205.

The feature determination unit 205 determines, based on the feature amount extracted by the feature amount extraction unit 204, the resolution of a person region an image of which the second imaging unit 203 captures and the type of a feature amount which the feature amount extraction unit 204 extracts from the captured image of the person region. Then, the feature determination unit 205 determines whether it is necessary to change the resolution of a person region and the type of a feature amount.

Furthermore, in the present exemplary embodiment, the degree of highness or lowness of the resolution of a person region corresponds to the numbers of pixels in the horizontal direction and the vertical direction of the person region (the size of the person region). In the present exemplary embodiment, it is expressed that the larger the numbers of pixels in the horizontal direction and the vertical direction of a person region (the larger the size of a person region), the higher the resolution thereof is, and it is expressed that the smaller the numbers of pixels in the horizontal direction and the vertical direction of a person region (the smaller the size of a person region), the lower the resolution thereof is. Moreover, in the present exemplary embodiment, the term "type of a feature amount" refers to, for example, the above-mentioned the size, color, and texture of the person region and the shapes and positions of the respective part regions in the face region of the person region. Details of the resolution of a person region and the type of a feature amount of the person region and details of feature determination processing by the feature determination unit 205 are described below.

Then, when determining that it is necessary to change the resolution of the person region based on the feature amount extracted by the feature amount extraction unit 204, the feature determination unit 205 sends, to the resolution change unit 206, determination result information indicating a resolution that is to be set by changing of the resolution.

Moreover, when determining that it is necessary to change the type of the feature amount that is extracted from the person region based on the feature amount extracted by the feature amount extraction unit 204, the feature determination unit 205 sends, to the feature amount change unit 207, determination result information indicating a type that is to be set by changing of the type.

In response to the determination result information supplied from the feature determination unit 205, the resolution change unit 206 sets, for example, the zoom magnification of the camera of the second imaging unit 203 in such a manner that an image of the person region is captured at the set resolution indicated by the determination result information. With this, the second imaging unit 203 captures an image of the object (person) corresponding to the person region selected by the above-mentioned imaging target selection unit 208 at the zoom magnification set by the resolution change unit 206. For example, in a case where a high zoom magnification is set, the second imaging unit 203 acquires an image in which the size of the person region is enlarged relative to the frame image by image capturing at a narrow angle of view with a long focal length, and outputs image data of the acquired image.

In response to the determination result information supplied from the feature determination unit 205, the feature amount change unit 207 performs setting on the feature amount extraction unit 204 in such a manner as to extract a feature amount of the type indicated by the determination result information. With this, the feature amount extraction unit 204 extracts a feature amount of the set type from a person region included in the image captured by the second imaging unit 203. Details of the type of a feature amount which the feature amount change unit 207 sets on the feature amount extraction unit 204 based on the determination result information supplied from the feature determination unit 205 are described below.

The video storage unit 210, which corresponds to a region for video storage in the secondary storage device 104 or the RAM 103 illustrated in FIG. 1, stores each frame image data of a wide-area image as a moving image captured by the first imaging unit 201.

The feature amount storage unit 209, which corresponds to a region for feature amount information storage in the secondary storage device 104 or the RAM 103 illustrated in FIG. 1, stores information on the feature amount extracted by the feature amount extraction unit 204. The feature amount to be stored in the feature amount storage unit 209 is stored in association with each person region of each frame image of a moving image stored in the video storage unit 210.

<Configuration of Object Search Function Unit>

A schematic configuration of the object search function unit 200B is described below.

When the image input device 105 is caused to capture an image of a person targeted for search, for example, by an instruction issued from the user via the input device 106 illustrated in FIG. 1, the query image input unit 211 of the object search function unit 200B acquires the captured image of the person as a query image targeted for search. The person image to be acquired as a query image can be an image captured by the first imaging unit 201 of the image input device 105, but is more desirably an image captured by the second imaging unit 203, which is a PTZ imaging camera, at a high zoom magnification. The image input device 105 performs image capturing on a person, for example, with panning, tilting, and zooming of the second imaging unit 203 operated in response to an instruction from the user via the input device 106. The query image input unit 211 acquires data of the person image captured by the image input device 105 as data of the query image. The data of the query image acquired by the query image input unit 211 is sent to the feature amount extraction unit 212.

Furthermore, the query image input unit 211 can acquire, as a query image targeted for search, for example, an image of a person region selected by an instruction from the user via the input device 106 in person regions included in the image captured by the image input device 105. As another example, the query image input unit 211 can acquire, as a query image targeted for search, for example, a person image previously captured and stored in a memory medium or a person image stored in a storage device on a network.

The feature amount extraction unit 212 extracts a feature amount from the query image. Details of the feature amount which the feature amount extraction unit 212 extracts from the query image in the present exemplary embodiment are described below. Information on the feature amount extracted from the query image by the feature amount extraction unit 212 is sent to the feature amount verification unit 213.

The feature amount verification unit 213 refers to feature amounts stored in the feature amount storage unit 209 in units of person ID using the feature amount extracted from the query image, and performs verification processing to determine whether a feature amount similar to the feature amount extracted from the query image is present. When determining that a feature amount similar to the feature amount of the query image is present in the feature amounts stored in the feature amount storage unit 209, the feature amount verification unit 213 reads out a person ID corresponding to the similar feature amount from the feature amount storage unit 209, and outputs the person ID to the search result output unit 214.

The search result output unit 214 reads out, based on the person ID read out from the feature amount storage unit 209 as being similar to the feature amount of the query image, a part of or a predetermined one of frame images in which an image of the person region associated with the person ID is shown from among the wide-area images stored in the video storage unit 210. Each frame image read out from the video storage unit 210 by the search result output unit 214 is sent to and displayed on the display device 107 illustrated in FIG. 1. With this, a moving image in a time period during which a person searched for based on the query image is shown from among the wide-area images is displayed on the screen of the display device 107.

<Resolution of Person Image and Type of Feature Amount>

The relationship between the above-mentioned resolution of a person region and the type of a feature amount is described below with reference to FIGS. 3A, 3B, and 3C.

Figure 3A:
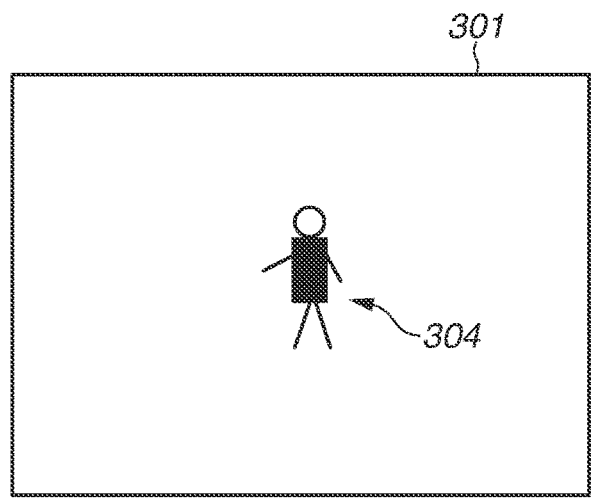
FIGS. 3A, 3B, and 3C are diagrams used to illustrate the relationship between the resolutions of an image and the types of a feature amount.
Figure 3B:
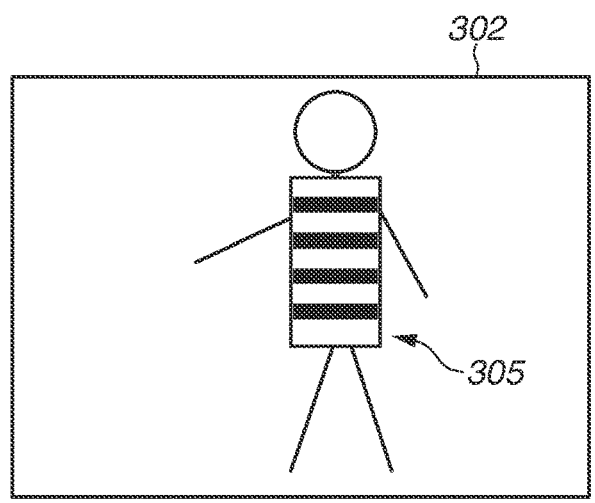
Figure 3C:
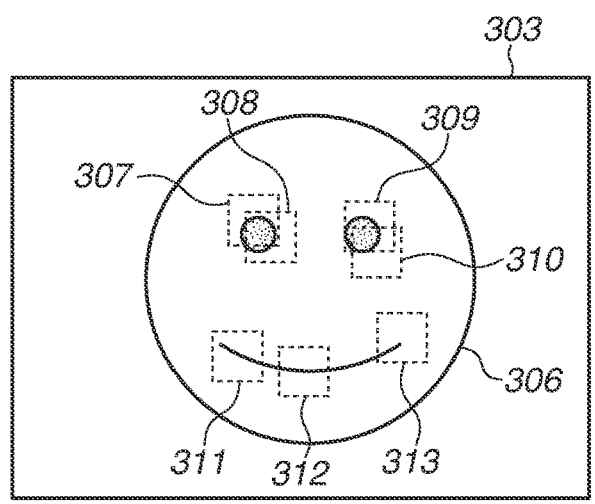

FIGS. 3A, 3B, and 3C illustrate examples of frame images 301, 302, and 303 obtained by capturing an image of one and the same person at respective different zoom magnifications. Moreover, the frame images 301, 302, and 303 are the same in size and are supposed to be images, for example, with the size of 640×480 pixels in the horizontal and vertical directions, respectively. A person region 304 in the frame image 301 illustrated in FIG. 3A is supposed to be a small-size image with the size of about 64×68 pixels in the horizontal and vertical directions, respectively. In the case of the small-size person region 304 such as that illustrated in FIG. 3A, the size thereof is small relative to the frame image 301, and is such a size as to enable about ten person images of the same size as that of the person region 304 to be arranged side by side in the frame image 301. A person region 305 in the frame image 302 illustrated in FIG. 3B is supposed to be a medium-size image with the size of about 210×480 pixels in the horizontal and vertical directions, respectively. In the case of the medium-size person region 305 such as that illustrated in FIG. 3B, the size thereof is such a size as to enable about three to four person images of the same size as that of the person region 305 to be arranged side by side in the frame image 302. In the example illustrated in FIG. 3C, only a face region 306 of the person region is shown in a large size in the frame image 303 with the size of 640×480 pixels in the horizontal and vertical directions, respectively. The face region 306 of the person region illustrated in FIG. 3C is a large-size image which occupies a major portion of the frame image 303. In the present exemplary embodiment, as described above, the magnitude of the size of a person region corresponds to the degree of highness or lowness of the resolution of the person region. Therefore, in the case of the present exemplary embodiment, the small-size person region 304 illustrated in FIG. 3A can be said to be a low-resolution image, the medium-size person region 305 illustrated in FIG. 3B can be said to be a medium-resolution image, and the large-size face region 306 illustrated in FIG. 3C can be said to be a high-resolution image.

Here, in the case of a small-size and low-resolution image such as the person region 304 illustrated in FIG. 3A, it is considered that minute features such as a design of the clothes of a person cannot almost be discriminated. Therefore, it is considered to be difficult to extract a feature amount indicating texture such as a design of the clothes from an image of the small-size and low-resolution person region 304. On the other hand, even in the case of a small-size and low-resolution image such as the person region 304, it is considered that the entire color of the person region 304 can be discriminated. Examples of the feature amount concerning color can include a color histogram that is based on a red (R) green (G) blue (B) color space of each pixel included in the person region 304. Moreover, the color space can be an HSV color space or a YCbCr color space. Additionally, the feature amount concerning color can be one histogram obtained by calculating all of the histograms of, for example, the respective RGB, HSV, and YCbCr color spaces and joining the histograms of the respective color spaces.

In the case of a medium-size and medium-resolution image such as the person region 305 illustrated in FIG. 3B, it is considered that texture such as a design of the clothes of a person can also be discriminated, unlike the small-size person region 304 illustrated in FIG. 3A. In the case of FIG. 3A and FIG. 3B, while, in FIG. 3A, for example, a jacket of the person region 304 is shown in solid black, the design of the jacket of the person region 305 is shown in stripes in FIG. 3B. Examples of the feature amount concerning texture can include a histogram obtained by applying, for example, a Gabor filter to the image of the person region 305. Moreover, to calculate a histogram, a Schmid filter can be used. Additionally, the feature amount concerning texture can be one histogram obtained by calculating histograms using the two filters and joining the histograms calculated using the two filters. Since the Gabor filter and the Schmid filter are publicly known, the description thereof is omitted.

In a case where the face region 306 of the person region occupies a major portion of the frame image 303 as illustrated in FIG. 3C, it is also considered possible to extract feature amounts from the respective part regions constituting the face region 306 of the person. In the case of FIG. 3C, since the shape of the face region 306, the shapes of the respective part regions, such as eyes and a mouth, and the relative positional relationship between the respective part regions in the face region 306 (for example, the distance between the eye and the mouth relative to the width of both eyes) can be discriminated, it is considered that those can be extracted as feature amounts. The method for extracting feature amounts of the respective part regions from the face region 306 includes, for example, clipping a plurality of small rectangular regions 307 to 313 from the face region 306 and extracting, for example, local binary pattern (LBP) feature amounts from the small rectangular regions 307 to 313. Then, the method obtains the shapes of the respective part regions in the face region 306 and the relative positional relationship between the respective part regions using the feature amounts of the small rectangular regions 307 to 313, so that the feature amounts of the respective part regions of the face region 306 can be extracted. Moreover, the feature amounts of the small rectangular regions 307 to 313 can be, for example, histogram of oriented gradients (HOG) feature amounts. Since the LBP feature amount and the HOG feature amount are publicly known, the detailed description thereof is omitted. Additionally, the plurality of small rectangular regions can be small rectangular regions located at random positions, or can be located in the respective vicinities of positions of parts (organs such as eyes, mouth, and nose) of the face previously detected as preprocessing.

As mentioned above, the type of a feature amount that can be extracted from a person region varies according to the size (resolution) of the person region, and it is understood that there is a type of feature amount suitable for the size (resolution) of the person region. Accordingly, the type of a feature amount that is extracted from a person region can be set according to the size (resolution) of the person region.

However, for example, in a case where a plurality of persons is shown in one frame image, if only feature amounts of the type corresponding to the sizes (resolutions) of the person regions are extracted, the respective person regions may not be individually discriminated.

<Resolution and Type of Feature Amount in a Case where a Plurality of Person Regions is Present in Frame Image>

The relationship between the resolution of a person region and the type of a feature amount for enabling a plurality of persons to be individually discriminated in a case where the plurality of persons is shown in one frame image is described below.

In a case where a plurality of person regions has been detected in one frame image, how to set the resolutions of the person regions and the types of the feature amounts can be determined by determining differences of features of the respective persons (objects) shown in a video scene captured by the image input device 105. The image processing apparatus according to the present exemplary embodiment determines the resolutions of the person regions (object regions) and the types of the feature amounts according to differences of features of the respective person regions (the respective object regions) shown in a video scene captured by the image input device 105. Hereinafter, a mode for the feature determination unit 205 to determine the resolution and the type of a feature amount by determining differences of features of a plurality of person regions in a video scene is referred to as a "high-resolution feature-oriented determination mode".

Here, as an example of a video scene captured by the image input device 105, suppose a scene in which four persons are shown in one frame image and the clothes of the four persons are different in color. In the case of such a video scene, since the colors of the clothes of the four persons are different from one another, extracting only the feature amounts of color with respect to the person regions of the four persons enables individually discriminating the respective person regions of the four persons based on the extracted feature amounts of color. Furthermore, the respective person regions of the four persons can be individually discriminated based on only the feature amounts of color even if, for example, the resolutions thereof are low.

On the other hand, as another example of a video scene captured by the image input device 105, suppose a scene in which, for example, four persons are shown in a video and the clothes of the four persons are the same in color but different in design. In the case of such a video scene, the person regions of the four persons are the same in the feature amount concerning color but different in the feature amount concerning texture such as a design. Therefore, extracting the feature amounts of texture with respect to the person regions of the four persons enables individually discriminating the respective person regions of the four persons based on the extracted feature amounts of texture. However, in the case of this video scene, since the feature amounts of texture of the person regions of the four persons have to be extracted, the resolutions of the person regions need to be set to at least a medium resolution or higher.

Furthermore, as a further example of a video scene captured by the image input device 105, suppose a scene in which, for example, four persons are shown in a video and the clothes of the four persons are the same in both color and design. In the case of such a video scene, it is considered that different feature amounts with respect to the four persons, the feature amounts of which are the same in both color and texture, are, for example, feature amounts of the respective part regions of the faces. Accordingly, in the case of this video scene, extracting the feature amounts of the respective part regions of the face regions of the four persons enables individually discriminating the four persons based on the extracted feature amounts of the respective part regions. However, in the case of this video scene, since the feature amounts of the respective part regions of the face regions of the four persons have to be extracted, the resolutions of the person regions need to be set to a high resolution.

Therefore, the image processing apparatus according to the present exemplary embodiment, in the high-resolution feature-oriented determination mode, first obtains feature amounts of color of the respective person regions, and, in a case where there is a difference between the feature amounts of color of the respective person regions, sets the resolutions of the person regions to a low resolution and sets the type of a feature amount to be extracted to the feature amount of color. On the other hand, in a case where the number of person regions that are not different in the feature amount of color is greater than a predetermined threshold value, the image processing apparatus according to the present exemplary embodiment sets the resolutions of the person regions to a medium resolution and sets the type of a feature amount to be extracted to the feature amount of texture. Furthermore, in a case where the number of person regions that are not different in both the feature amounts of color and texture is greater than a predetermined threshold value, the image processing apparatus according to the present exemplary embodiment sets the resolutions of the person regions to a high resolution and sets the type of a feature amount to be extracted to the feature amounts of the respective part regions of the face region. Moreover, although details of the predetermined threshold values to be compared with the number of person regions are described below, an example of the predetermined threshold value is a value previously set as the number of images of the respective person regions considered to be easy to, for example, visually discriminate during an object search performed later. In a case where, for example, visually checking images of the respective person regions during an object search performed later is not assumed, the predetermined threshold value with respect to the number of person regions can be set to, for example, "2". In a case where the predetermined threshold value with respect to the number of person regions is set to "2", when two or more person regions that are not different in the feature amount are present, an operation for changing the setting of the resolution or the type of a feature amount is performed.

As described above, the image processing apparatus according to the present exemplary embodiment sets the resolution of a person region (object region) and the type of a feature amount to be extracted, according to a feature difference between persons shown in a video scene captured by the image input device 105. The image processing apparatus according to the present exemplary embodiment, at the time of startup, performs setting processing for the resolution and the type of a feature amount according to the high-resolution feature-oriented determination mode. Then, the image processing apparatus according to the present exemplary embodiment acquires image data of each person region at the resolution set in the high-resolution feature-oriented determination mode at the time of startup, and also extracts a feature amount of the set type. The mode for extracting image data and a feature amount of each person region according to the resolution and the type of a feature amount set in the high-resolution feature-oriented determination mode in the above-described way is hereinafter referred to as an "operation mode".

However, a video scene may vary without being fixed even during the operation mode. Here, switching between the "high-resolution feature-oriented determination mode" and the "operation mode" is described with reference to the flowchart of FIG. 9. It is considered that a person or persons shown in a video may vary (a different person may appear in a video) as time proceeds. Therefore, in step S901, the image processing apparatus according to the present exemplary embodiment determines whether a predetermined time (a fixed time previously determined) has elapsed during the operation mode. If the image processing apparatus determines that the predetermined time has elapsed (YES in step S901), then in step S903, the image processing apparatus performs switching to the high-resolution feature-oriented determination mode, in which the feature determination unit 205 performs re-setting of the resolution and the type of a feature amount. Moreover, it is considered that, when a new person enters a monitoring area, the number of person regions shown in a video may increase. Therefore, in step S902, the image processing apparatus according to the present exemplary embodiment determines whether the number of person regions shown in a video has increased during the operation mode. If the image processing apparatus determines that the number of person regions shown in a video has increased (YES in step S902), then also in step S903, the image processing apparatus performs switching to the high-resolution feature-oriented determination mode, thus performing re-setting of the resolution and the type of a feature amount. After that, in step S904, the image processing apparatus performs switching back to the operation mode.

<Processing in High-Resolution Feature-Oriented Determination Mode>

Figure 4:
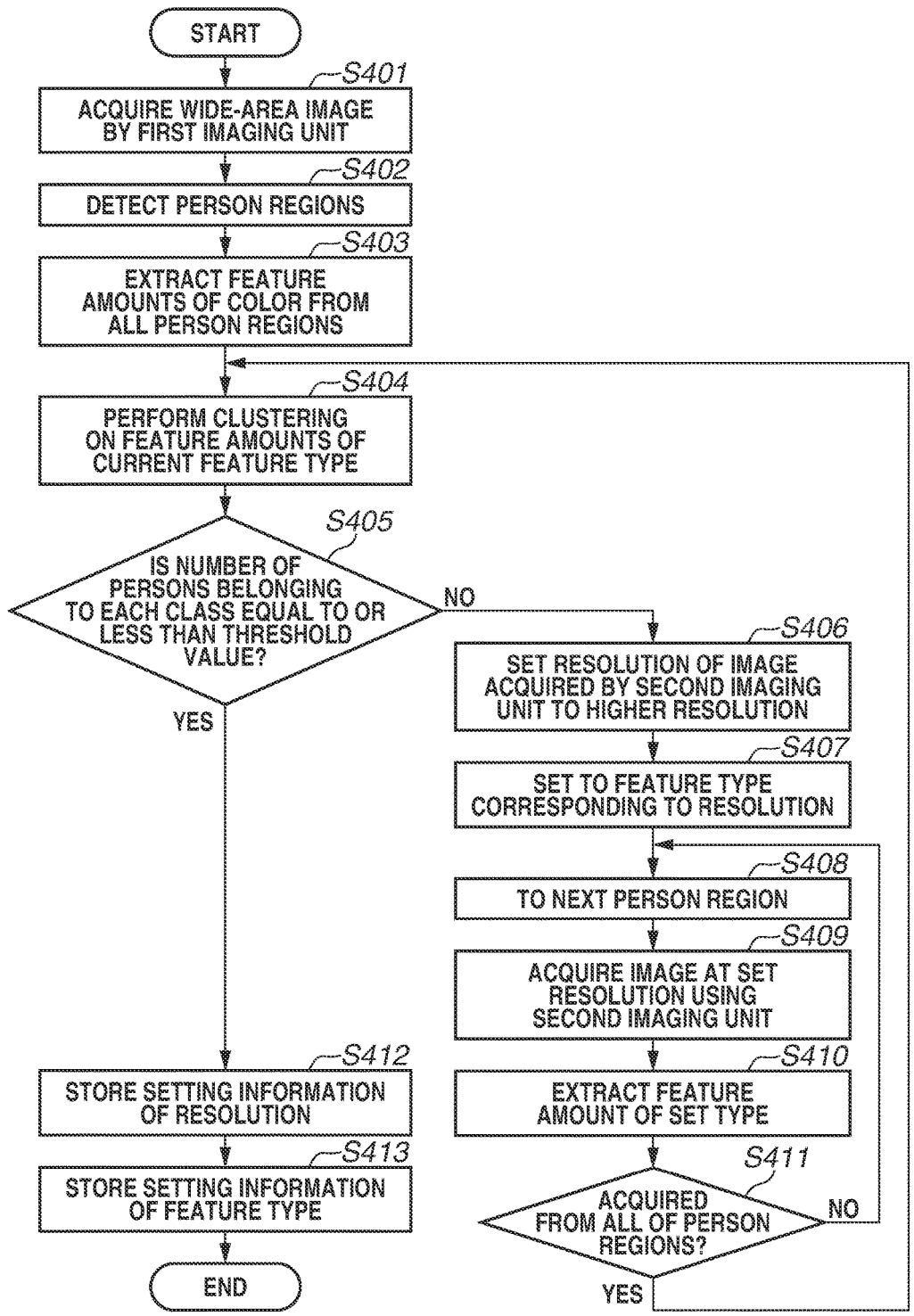
FIG. 4 is a flowchart illustrating the flow of processing during a high-resolution feature-oriented determination mode.

FIG. 4 illustrates the flow of processing in the high-resolution feature-oriented determination mode performed by the image processing apparatus according to the present exemplary embodiment. The high-resolution feature-oriented determination mode is described below with reference to the flowchart of FIG. 4. FIG. 4 is a flowchart in which a case where a plurality of person regions is detected in a frame image is assumed.

Referring to FIG. 4, in step S401, the first imaging unit 201 of the image input device 105 captures a moving image of the entire monitoring area, thus acquiring a frame image at intervals of a predetermined time. In step S402, with respect to frame images of a wide-area image captured by the first imaging unit 201 of the image input device 105, the person detection unit 202 of the object feature extraction function unit 200A detects all of the person regions in each of the frame images.

Here, the person detection unit 202 previously generates a background model from an image obtained by capturing only an image of the background, obtains a difference between the wide-area image captured by the first imaging unit 201 and the background model, and detects a difference region from the background model as a person region. Such a method for detecting a person region based on a difference from the background model is discussed, for example, in the following literature:

Stauffer C, Grimson W. E. L.: Adaptive background mixture models for real-time tracking. In Proceedings of 1999 IEEE Computer Society Conference on Computer Vision and Pattern Recognition (Cat. No PR00149). IEEE Comput. Soc. Part Vol. 2, 1999.

Furthermore, the person detection unit 202 can detect a person region using, for example, a technique discussed in U.S. Patent Application Publication No. 2007/0237387. Although the detailed description of the technique is omitted, a summary of the technique is as follows. The technique performs scanning on an input image with a detection window having a predetermined size, and performs two-class discrimination as to whether the object is a person with respect to pattern images obtained by clipping an image within the detection window. In this discrimination, a classifier is structured by effectively combining a number of weak classifiers using Adaptive Boosting (AdaBoost), thus improving the discrimination accuracy. Moreover, the weak classifiers are connected in series, so that a cascade-type detector is configured. The weak classifier is configured with histogram of oriented gradients (HOG) feature amounts. The cascade-type detector first removes candidates of patterns clearly having no object on the spot, using a simple classifier at the front stage, and then performs discrimination as to whether the object is a person, using a complicated classifier at the rear stage having a higher discrimination capability, with respect to only the other candidates.

The person detection unit 202 in the present exemplary embodiment detects a person region in the above-described method, and temporarily stores, in the RAM 103, (x, y) coordinates of two points of the upper left corner and lower right corner of a rectangular region circumscribing the detected person region as data indicating the position of a person region and the range of the person region.

Furthermore, while, in the present exemplary embodiment, a person is used as an object targeted for detection by way of example, the object targeted for detection can be another object, for example, a vehicle. In this case, a vehicle detection unit can be provided in place of the person detection unit 202, so that an image region of a vehicle can be detected from a wide-area image. Moreover, detection of an image region of a vehicle can be implemented by utilizing the above-described method for person region detection. After step S402, the processing performed by the object feature extraction function unit 200A proceeds to step S403, which is performed by the feature amount extraction unit 204.

In step S403, the feature amount extraction unit 204 extracts feature amounts of the type set at this point with respect to all of the person regions detected by the person detection unit 202. In initial setting, the feature amount extraction unit 204 extracts the above-mentioned histogram feature amounts as feature amounts concerning color. The feature amount extraction unit 204 stores the extracted feature amounts in the RAM 103 or the feature amount storage unit 209 of the secondary storage device 104 in association with information on the respective person regions. After step S403, the processing performed by the object feature extraction function unit 200A proceeds to step S404, which is performed by the feature determination unit 205.

In step S404, the feature determination unit 205 performs clustering on the feature amounts for the respective person regions extracted by the feature amount extraction unit 204 within the feature amount space thereof.

Here, the method for clustering is not specifically limited, and in the present exemplary embodiment, a mean shift clustering method discussed in the following literature is used:

D. Comaniciu and P. Meer: Mean shift: A robust approach toward Feature space analysis. PAMI, 24(5): 603-619, 2002.

The mean shift clustering method according to a summary thereof is a method of expressing a probability density distribution by a kernel function such as a Gaussian function and obtaining a local maximum point of the distribution by repeating the following step. The mean shift clustering method first provides an initial position, obtains an average of sample points included in a specified width of a kernel, and sets the obtained average as the center of a Gaussian kernel to obtain an average of sample points again. The number of local maximum points found by the above processing being repeated until it converges serves as the number of classes. After step S404, the feature determination unit 205 advances the processing to step S405.

In step S405, the feature determination unit 205 determines whether the number of feature amounts (which corresponds to the number of persons because of one feature for each person region) belonging to each class obtained in step S404 is equal to or less than a predetermined threshold value. Here, if, in all of the classes, the number of persons (the number of feature amounts) belonging to each class is equal to or less than, for example, 5, the number of persons that are searched for as feature amounts similar to the feature amount of a person in a query image at the time of an object search performed later is 5 at most. In a case where, at the time of the object search, such a search result is presented to the user, the user only has to visually check a desired person from among at most 5 persons. In this way, if the number of candidates of the search result is sufficiently small, visual checking becomes easy.

Moreover, while, in the above description, the determination in step S405 is performed on person regions in one frame image, results for several frames can be temporarily stored in the RAM 103 to be used later, so as to avoid the influence due to undetection or false detection of a person region. At this time, one and the same person may be redundantly counted as much as the number of frames used for the determination. Therefore, when comparing the number of persons (the number of feature amounts) of each class with the threshold value in step S405, the feature determination unit 205 divides the number of persons belonging to each class by the number of frames, and rounds the quotient to the closest whole number to be used.

On the other hand, if, in the determination in step S405, it is determined that the number of feature amounts (the number of persons) belonging to each class is not equal to or less than the predetermined threshold value, since a search result may not be sufficiently narrowed down during an object search performed later, feature amounts need to be extracted from more high-resolution person regions. Therefore, when determining that the number of feature amounts belonging to each class is not equal to or less than the predetermined threshold value in step S405, the feature determination unit 205 sends determination result information indicating a higher resolution to the resolution change unit 206, and further sends determination result information indicating the type of a feature amount corresponding to the higher resolution to the feature amount change unit 207.

In the case of the present exemplary embodiment, as mentioned above with reference to FIGS. 3A to 3C, the resolution is settable to three stages, a low resolution, a medium resolution, and a high resolution. Therefore, when determining that the number of feature amounts belonging to each class is not equal to or less than the predetermined threshold value in step S405, the feature determination unit 205 sends, to the resolution change unit 206, determination result information indicating the medium resolution if the current resolution is the low resolution, or determination result information indicating the high resolution if the current resolution is the medium resolution. Furthermore, in the case of the present exemplary embodiment, as mentioned above, the feature amount of color is associated with the low resolution, the feature amount of texture is associated with the medium resolution, and the feature amounts of respective part regions of the face region are associated with the high resolution. In the present exemplary embodiment, association information indicating associations between the respective resolutions and the types of feature amounts is stored in the secondary storage device 104 as a resolution-dependent feature type list 220. The object feature extraction function unit 200A reads out the resolution-dependent feature type list 220 from the secondary storage device 104, for example, at the time of startup, and stores it into the RAM 103. Then, when sending determination result information indicating a resolution to the resolution change unit 206, the feature determination unit 205 refers to the type of a feature amount corresponding to the resolution from the resolution-dependent feature type list 220, and sends determination result information indicating the type of the feature amount to the feature amount change unit 207. After, in step S405, the feature determination unit 205 determines that the number of feature amounts belonging to each class is not equal to or less than the predetermined threshold value (NO in step S405) and outputs the above-described determination result information, the object feature extraction function unit 200A advances the processing to step S406, which is performed by the resolution change unit 206.

In step S406, the resolution change unit 206 sets the zoom magnification of the second imaging unit 203 based on the determination result information indicating a higher resolution supplied from the feature determination unit 205, thus enabling capturing a more high-resolution image. After step S406, the object feature extraction function unit 200A advances the processing to step S407, which is performed by the feature amount change unit 207. Moreover, the processing in step S407 can be performed at the same time as that in step S406.

In step S407, the feature amount change unit 207 sets the type of a feature amount to be extracted by the feature amount extraction unit 204, based on the determination result information indicating the type of a feature amount supplied from the feature determination unit 205. This then enables the feature amount extraction unit 204 to extract the feature amount of the type set by the feature amount change unit 207. After step S407, the object feature extraction function unit 200A advances the processing to step S408, which is performed by the imaging target selection unit 208.

In step S408, the imaging target selection unit 208 selects one person region from among a plurality of person regions detected by the person detection unit 202 in step S402. More specifically, the imaging target selection unit 208 first selects a person region closest to the upper left corner in the frame image. After step S408, the imaging target selection unit 208 advances the processing to step S409.

In step S409, the imaging target selection unit 208 sets the direction of the lens of the camera of the second imaging unit 203 in such a manner that a person corresponding to the person region selected in step S408 is shown approximately at the center of the image plane of the second imaging unit 203, to cause the second imaging unit 203 to perform image capturing.

While, in the present exemplary embodiment, an example is described in which the imaging direction of the second imaging unit 203 can be changed by, for example, panning and tilting, the image of a person region can be acquired, for example, by such electronic readout control as to change a readout area of the image sensor of the camera of the second imaging unit 203.

Furthermore, while, in the present exemplary embodiment, an example is described in which a high-resolution image is acquired by increasing the zoom magnification of the second imaging unit 203, a high-resolution image can be acquired using, for example, a method called super-resolution. For example, a high-resolution image can be generated using a method of interpolating pixels based on a plurality of low-resolution frame images, such as that discussed in the following literature:

Sean Borman, Robert L. Stevenson: Super-Resolution from Image Sequences—A Review. Circuits and Systems, 1998. Moreover, a high-resolution image can be generated using, for example, a method of previously preparing a dictionary by learning image patterns of person images and interpolating pixels using the dictionary, such as that discussed in the following literature:

Jianchao Yang, John Wright, Thomas Huang, Yi Ma: Image Super-Resolution as Sparse Representation of Raw Image Patches. Computer Vision and Pattern Recognition, 2008.

In the case of using the above-mentioned pixel interpolation methods, a configuration for performing such pixel interpolation processing is supposed to be provided in the second imaging unit 203.

After step S409, the object feature extraction function unit 200A advances the processing to step S410, which is performed by the feature amount extraction unit 204.

In step S410, the feature amount extraction unit 204 extracts a feature amount of the type set in step S407 from the person region obtained by the second imaging unit 203 performing image capturing in step S409. After step S410, the object feature extraction function unit 200A advances the processing to step S411, which is performed by the imaging target selection unit 208.

In step S411, the imaging target selection unit 208 determines whether the above-described selection of a person region and the acquisition of an image by image capturing performed by the second imaging unit 203 have been performed with respect to all of the person regions detected by the person detection unit 202 in step S402. If, in step S411, the imaging target selection unit 208 determines that the selection of a person region and the acquisition of an image have not been performed with respect to all of the person regions (NO in step S411), the processing returns to step S408.

Having returned to step S408, the imaging target selection unit 208 selects a person region closest to the upper left corner from among the person regions not yet selected in the frame image. With this, in the following steps S409 and S410, the acquisition of an image by the second imaging unit 203 and the extraction of a feature amount by the feature amount extraction unit 204 are performed with respect to the selected person region. The processing in steps S408 to S410 is repeated until it is determined in step S411 that the processing has been performed with respect to all of the person regions. Then, if it is determined in step S411 that the processing has been performed with respect to all of the person regions (YES in step S411), the object feature extraction function unit 200A returns the processing to the above-described step S404, which is performed by the feature determination unit 205.

In step S404 at this time, the feature determination unit 205 re-performs clustering with respect to the feature amounts of the types of the person regions obtained by the processing performed so far. Moreover, in the next step S405, the feature determination unit 205 determines whether the number of persons belonging to each class becomes equal to or less than the threshold value. The processing performed in steps S404 and S405 and returning to step S404 via step S406 to step S411 is performed until the number of persons belonging to each class becomes equal to or less than the predetermined threshold value in step S405. Then, if it is determined in step S405 that the number of feature amounts (the number of persons) belonging to each class is equal to or less than the threshold value (YES in step S405), the feature determination unit 205 advances the processing to step S412.

In step S412, the feature determination unit 205 temporarily stores setting information of the current resolution in a setting information storage unit 221 of the RAM 103. After step S412, the feature determination unit 205 advances the processing to step S413. In step S413, the feature determination unit 205 temporarily stores setting information of the type of a feature amount in the setting information storage unit 221 of the RAM 103. Moreover, processing in step S412 and processing in step S413 can be set in reverse order or can be performed at the same time. When the processing in steps S412 and S413 is completed, the image processing apparatus ends the processing in the high-resolution feature-oriented determination mode.

<Processing in Operation Mode>

Figure 5:
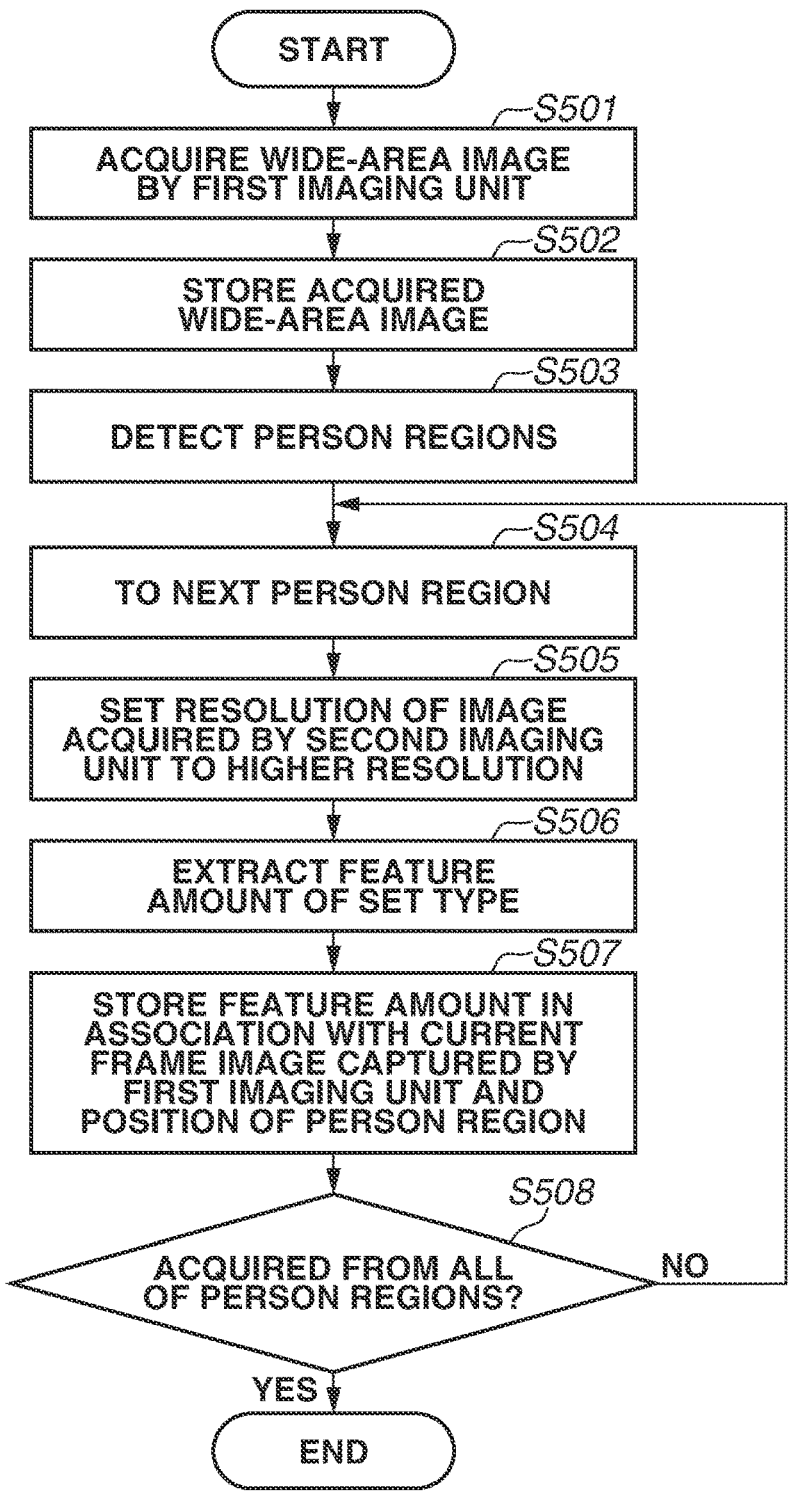
FIG. 5 is a flowchart illustrating the flow of processing during an operation mode.

After the setting of the resolution and the setting of the type of a feature amount in the above-described high-resolution feature-oriented determination mode have been completed, the image processing apparatus according to the present exemplary embodiment shifts to the operation mode of storing the respective person regions and the feature amounts while associating them with each other. The flow of processing performed by the image processing apparatus in the operation mode is described below with reference to the flowchart of FIG. 5.

When the image processing apparatus has shifted to the operation mode, in step S501, the first imaging unit 201 of the image input device 105 captures an image of the entire monitoring area to acquire a frame image at intervals of a predetermined time. Then, in step S502, the object feature extraction function unit 200A stores each frame data acquired at intervals of the predetermined time by the first imaging unit 201 in the video storage unit 210. The acquisition of a frame image in step S501 and the storage of frame image data in step S502 are continued until the operation mode is stopped.

Then, in the operation mode, in step S503, the person detection unit 202 detects all of the person regions using a method similar to that described in step S402 from each frame image captured by the first imaging unit 201. After step S503, the object feature extraction function unit 200A advances the processing to step S504, which is performed by the imaging target selection unit 208.

In step S504, the imaging target selection unit 208 selects one person region using a method similar to that described in step S408 from among a plurality of person regions detected by the person detection unit 202 in step S503. After step S504, the object feature extraction function unit 200A advances the processing to step S505.

In step S505, as in the above-described step S409, the imaging target selection unit 208 controls the direction of the lens of the second imaging unit 203 in such a manner that a person corresponding to the person region selected in step S504 is shown approximately at the center of the image plane of the second imaging unit 203. Furthermore, in step S505, the resolution change unit 206 reads out the setting information of the resolution set in the high-resolution feature-oriented determination mode from the setting information storage unit 221 of the RAM 103 and causes the second imaging unit 203 to perform image capturing at the zoom magnification corresponding to the set resolution. After step S505, the object feature extraction function unit 200A advances the processing to step S506, which is performed by the feature amount extraction unit 204.

In step S506, the feature amount extraction unit 204 reads out the setting information of the type of a feature amount set in the high-resolution feature-oriented determination mode from the setting information storage unit 221 of the RAM 103. Then, the feature amount extraction unit 204 extracts a feature amount of the set type from a person region in the image acquired in step S505. After step S506, the feature amount extraction unit 204 advances the processing to step S507.

In step S507, the feature amount extraction unit 204 stores information on the feature amount extracted in step S506 in the feature amount storage unit 209. At that time, the feature amount extraction unit 204 stores the information on the feature amount in association with information indicating a frame number of the current frame image which is captured by the first imaging unit 201 and in which the person detection unit 202 is detecting a person, the type of the feature amount, and the person region from which the feature amount has been extracted.

Furthermore, while, in the present exemplary embodiment, the information on the feature amount is stored in association with the frame image captured by the first imaging unit 201, a frame image captured by the second imaging unit 203 can also be stored and the information on the feature amount can be stored in association with only an image captured by the second imaging unit 203 or both images captured by the first imaging unit 201 and the second imaging unit 203.

After step S507, the object feature extraction function unit 200A advances the processing to step S508, which is performed by the imaging target selection unit 208.

In step S508, the imaging target selection unit 208 determines whether processing for the above-described selection of a person region, the image capturing by the second imaging unit 203, and the extraction of a feature amount by the feature amount extraction unit 204 has been performed with respect to all of the person regions detected by the person detection unit 202 in step S504. If, in step S508, the imaging target selection unit 208 determines that the above processing has not been performed with respect to all of the person regions (NO in step S508), the processing returns to step S504.

Having returned to step S504, the imaging target selection unit 208 selects a person region closest to the upper left corner from among the person regions not yet selected in the frame image. With this, in the following steps S505 to S507, the above-described processing is performed with respect to the selected person region. The processing in steps S504 to S507 is repeated until it is determined in step S508 that the processing has been performed with respect to all of the person regions.

In the operation mode, the above-described processing is repeated each time a new frame image is acquired by the first imaging unit 201, so that each frame image captured by the first imaging unit 201 and the feature amount associated with a person region present in each frame image can be stored. Then, if, in step S508, it is determined that the processing has been performed with respect to all of the person regions (YES in step S508), the processing in the operation mode by the object feature extraction function unit 200A ends.

<Object Search Processing by Object Search Function Unit>

The flow of processing performed when the object search function unit 200B searches for a frame image based on a query image from a moving image stored in the video storage unit 210 is described below with reference to the flowchart of FIG. 6. The object search function unit 200B performs verification on feature amounts stored in the feature amount storage unit 209 using a feature amount extracted from a query image, as described above, thus searching for a frame image similar in feature amount to the query image from among a moving image stored in the video storage unit 210.

Figure 6:
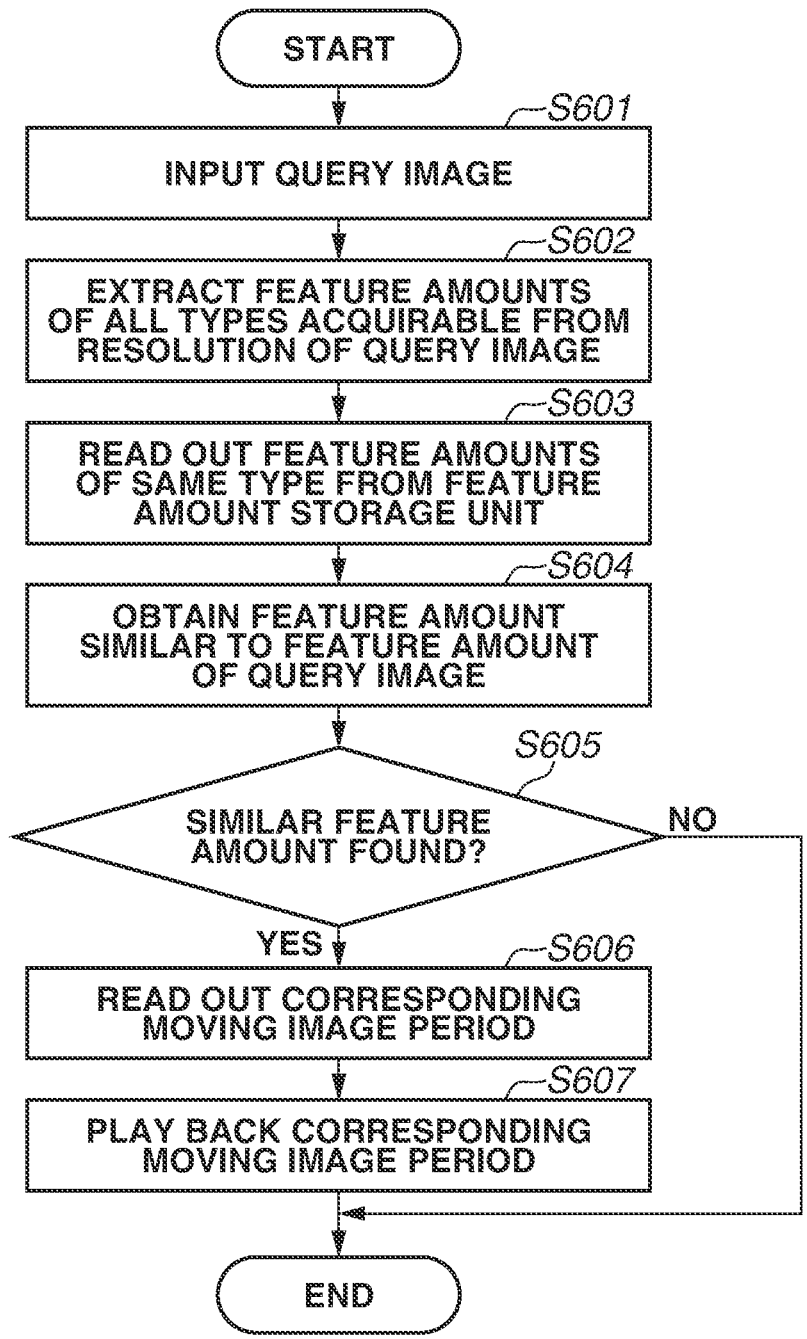
FIG. 6 is a flowchart illustrating the flow of object search processing.

In the flowchart of FIG. 6, in step S601, the query image input unit 211 of the object search function unit 200B acquires an image of a person to be searched for as a query image. In the case of the present exemplary embodiment, in step S601, the query image input unit 211, for example, causes the image input device 105 to capture an image of a person to be searched for based on an instruction issued from the user via the input device 106, and acquires the captured image of the person as a query image. After step S601, the object search function unit 200B advances the processing to step S602, which is performed by the feature amount extraction unit 212.

In step S602, the feature amount extraction unit 212 extracts, from a person region of the query image, feature amounts of all the types acquirable according to the resolution of the person region. Extracting feature amounts of all the types acquirable according to the resolution includes, for example, extracting a feature amount of color from a low-resolution image, extracting a feature amount of texture from a medium-resolution image, and extracting feature amounts of respective parts of a face region from a high-resolution image. In the present exemplary embodiment, as described above, a feature amount of color associated with a low resolution, a feature amount of texture associated with a medium resolution, and feature amounts of respective parts of a face region associated with a high-resolution are listed in the resolution-dependent feature type list 220.

Accordingly, the feature amount extraction unit 212 extracts feature amounts of all the types acquirable according to a resolution from a query image, for example, based on information stored in the resolution-dependent feature type list 220. For example, if a person region in the query image is a medium-resolution image such as the above-mentioned person region 305 of the frame image 302 illustrated in FIG. 3B, the feature amount extraction unit 212 extracts a feature amount concerning texture. Moreover, for example, if a person region in the query image is only the face region 306 of the frame image 303 illustrated in FIG. 3C, the feature amount extraction unit 212 extracts feature amounts concerning respective part regions of the face region 306. Additionally, for example, the feature amount extraction unit 212 can, for example, reduce the query image acquired by the query image input unit 211 and can extract a feature of the type corresponding to the resolution of the reduced image. For example, in a case where the person region in the query image is a medium-resolution image such as the person region 305 illustrated in FIG. 3B, the feature amount extraction unit 212 can reduce the medium-resolution image to a low resolution comparable with that of the person region 304 illustrated in FIG. 3A, and thus can extract a feature amount of color corresponding to the low resolution. Conversely, the feature amount extraction unit 212 can enlarge the query image to a high-resolution image by the above-mentioned pixel interpolation processing, and can extract, from the high-resolution query image, a feature amount of the type corresponding to the resolution thereof. After step S602, the object search function unit 200B advances the processing to step S603, which is performed by the feature amount verification unit 213.

In step S603, the feature amount verification unit 213 refers to information on feature amounts stored in the feature amount storage unit 209, and reads out all of information on feature amounts of the same type as that of the feature amounts extracted in step S602 from the feature amount storage unit 209. After step S603, the feature amount verification unit 213 advances the processing to step S604.

In step S604, the feature amount verification unit 213 calculates, as a distance between feature amounts, an Euclidean distance between each of all the feature amounts of the same type read out in step S603 and each feature amount of the query image in a feature amount space expressed as an Euclidean space. Then, the feature amount verification unit 213 sets each feature amount the distance between which and each feature amount of the query image is within a threshold value in the feature amounts read out in step S603, as a similar feature amount. In this way, the feature amount verification unit 213 obtains all of the features amounts similar to the feature amounts of the query image from among the feature amounts read out in step S603. After step S604, the object search function unit 200B advances the processing to step S605, which is performed by the search result output unit 214.

In step S605, the search result output unit 214 determines whether a similar feature amount has been found in step S604 from among the feature amounts read out in step S603. If, in step S605, it is determined that no similar feature amount has been found (NO in step S605), the search result output unit 214 ends the search processing performed by the object search function unit 200B. On the other hand, if, in step S605, it is determined that a similar feature amount has been found (YES in step S605), the search result output unit 214 advances the processing to step S606.

In step S606, the search result output unit 214 refers to a frame number associated with the similar feature amount. Then, the search result output unit 214 reads out all of data of frame images of a moving image (frame images in a moving image period) corresponding to the frame number from the video storage unit 210. After step S606, the search result output unit 214 advances the processing to step S607.

In step S607, the search result output unit 214 sequentially sends the frame images read out in step S606 to the display device 107. With this, each frame image read out in step S606 is displayed on the display device 107 (frame images in the moving image period are played back). Thus, displaying on the display device 107 presents a search result to the user. When all of the frame images read out in step S606 have been displayed in step S607, the processing by the object search function unit 200B ends.

In the above-described exemplary embodiment, in step S405 illustrated in FIG. 4, in a case where the number of feature amounts belonging to each class is not equal to or less than the threshold value, a more high-resolution person region is obtained and, then, a feature amount of the person region is acquired. This is especially effective in a relatively simple video scene, for example, a case where all of the captured person images are able to be discriminated based on colors of the clothes thereof or able to be discriminated based on designs of the clothes thereof. However, a more complicated video scene, for example, a case where, while the number of persons belonging to a class is equal to or less than the threshold value, the number of persons belonging to another class is greater than the threshold value can be considered. A more specific example is a video scene in which there are four persons wearing clothes in vertical black and white stripes, four persons wearing clothes in horizontal black and white stripes, and one person wearing red clothes. If, in such a video scene, the person region is shown at a low resolution, the details of both the vertical-stripe design and the horizontal-stripe design may be shown lost, so that the clothes may be shown in solid black as in the frame image 301 illustrated in FIG. 3A. In this case, the feature determination unit 205 may erroneously determine that such person regions have the same feature amount based on the feature amount (histogram) of color, and thus may determine that there are eight persons belonging to a black class and one person belonging to a red class. Then, the feature determination unit 205 may determine that the number of persons belonging to the black class is eight, which is greater than the threshold value, and may determine that a high-resolution person region needs to be obtained and the type of the feature amount thereof is texture. However, since, in the case of searching for a person or persons wearing red clothes, the search result can be narrowed down to one person, essentially, it is considered that features of a more high-resolution image are not needed. Then, in this case, since the processing is performed according to a class using a feature amount corresponding to the most high-resolution person region, such a complicated video scene may somewhat increase a processing load, thus decreasing a processing efficiency, and may increase the amount of used memory.

Another exemplary embodiment for preventing a decrease in processing efficiency and an increase in the amount of used memory in such a complicated video scene as mentioned above is described below.

In the present exemplary embodiment, during the high-resolution feature-oriented determination mode, information indicating whether a feature amount corresponding to a high-resolution image is needed with respect to each class is additionally stored. More specifically, as information on a class using a feature amount corresponding to a more high-resolution image, a representative value of the feature amount belonging to the class (the value of the center of mass of the class) is stored in the RAM 103 as a "needed high-resolution feature amount" in association with the resolution of a person region used during clustering. In the above-described example, the representative value of the feature amount belonging to the black class associated with the low-resolution image is set as the needed high-resolution feature amount. In the above-described step S405 illustrated in FIG. 4, the determination is performed on a class-by-class basis, and, with respect to a person region from which a feature amount of the type belonging to a class exceeding the threshold value has been extracted, the type of a feature amount corresponding to a more high-resolution image is set. Then, information indicating the "needed high-resolution feature amount" is additionally stored with respect to the person region. Furthermore, in the case of the above-described exemplary embodiment, during the "operation mode", a uniform resolution and a uniform type of feature amount are used in steps S505 and S506 illustrated in FIG. 5. On the other hand, in the case of the present exemplary embodiment, during the "operation mode", a feature amount extracted from the person region and a feature amount in the needed high-resolution feature amount stored in the RAM 103 are compared with each other, and, only when those feature amounts are similar, a more high-resolution image is additionally acquired in step S505. Then, in step S506, the type of a feature amount can be changed. In the above-described example, only when the feature amount of color extracted from the low-resolution person region is close to the representative value of the black class, an image in which the person region is shown at a medium resolution is acquired and a feature amount of texture is extracted.

According to the present exemplary embodiment, a decrease in processing efficiency and an increase in the amount of used memory in a more complicated video scene can be prevented.

Furthermore, as another exemplary embodiment, the person detection unit 202 can be incorporated in an integrated circuit chip and can be integrated with the first imaging unit 201 into a single device. Additionally, the feature amount extraction unit 204, the feature determination unit 205, and the feature amount change unit 207 can be incorporated in an integrated circuit chip and can be integrated with the second imaging unit 203, the imaging target selection unit 208, and the resolution change unit 206 into a single device. Then, the two devices, the feature amount storage unit 209, and the video storage unit 210 can be connected by a network.

Moreover, while, in the present exemplary embodiment, a wide-area imaging camera and a PTZ imaging camera are used, the present disclosure can be applied to a camera having a high-resolution image sensor (having a great number of pixels). In a high-resolution camera, since the larger the number of pixels of the image sensor, the larger the amount of data read out from the image sensor becomes, a processing load and the amount of used memory (or the width of a bus for transfer) also become issues.

Figure 7:
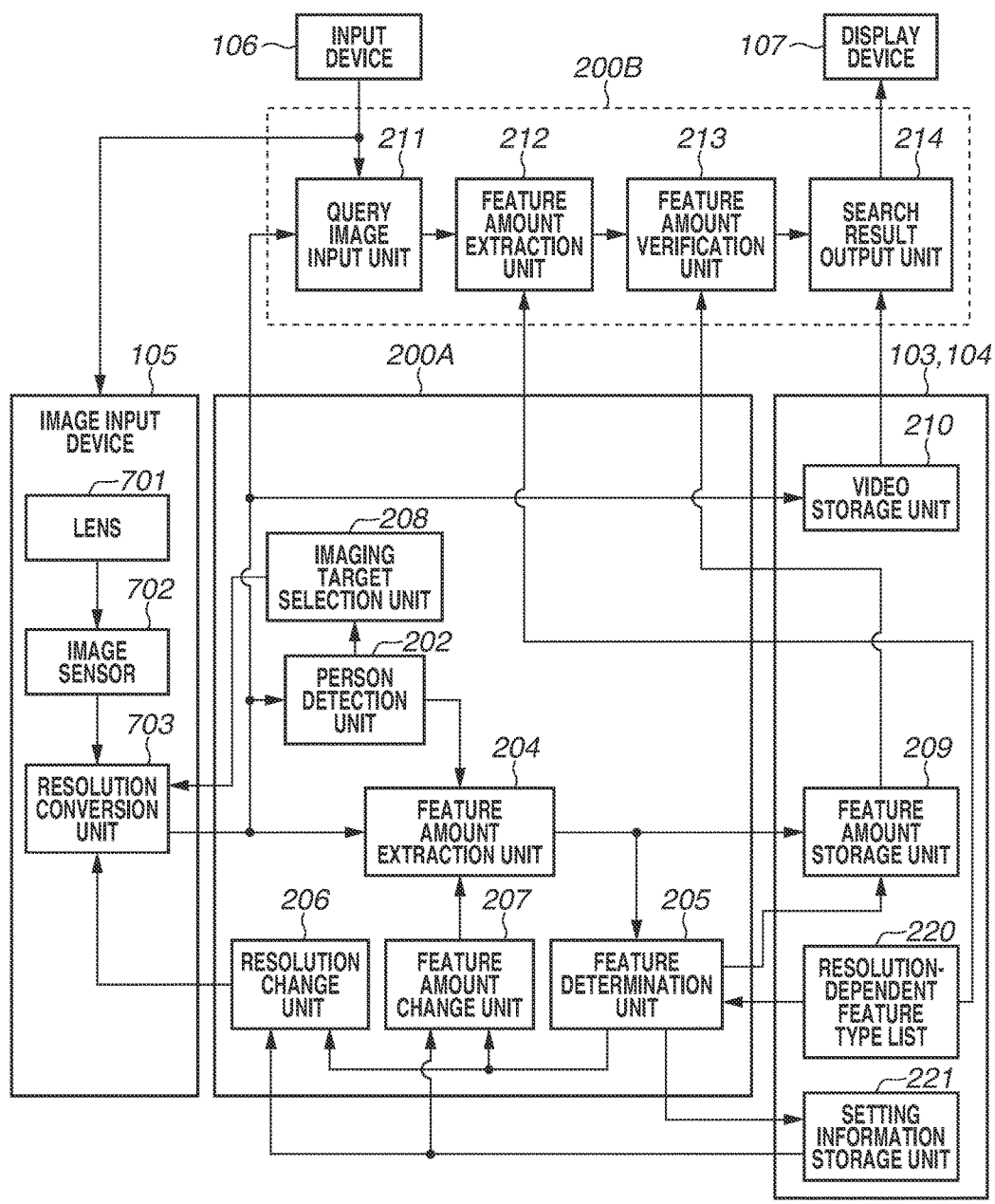
FIG. 7 illustrates a configuration example of various functional units of an image processing apparatus according to another exemplary embodiment.

FIG. 7 illustrates a configuration example of an image processing apparatus using a high-resolution camera as an image input device. Moreover, the elements having functions similar to those of the elements illustrated in FIG. 2 are assigned the respective same reference numerals. The image input device 105, which corresponds to the high-resolution camera, includes a lens 701, a high-resolution image sensor 702, and a resolution conversion unit 703. In the case of using the high-resolution camera, a video corresponding to the wide-area imaging camera can be obtained by the resolution conversion unit 703 thinning out pixels of the image sensor 702 and reading out data from the entire area of the image sensor 702.

Figure 8:
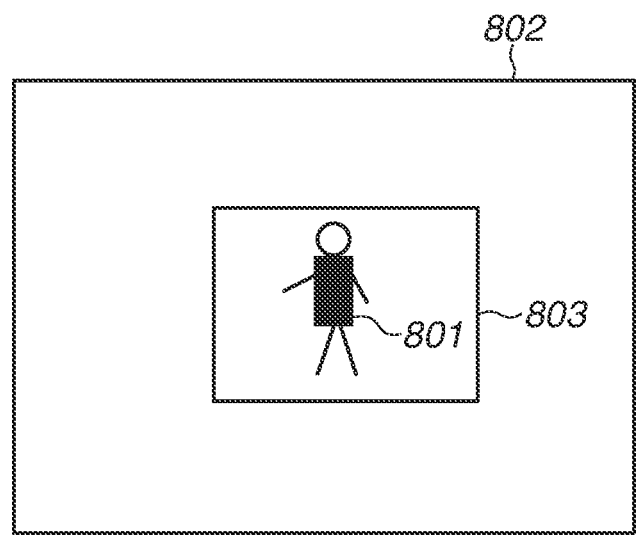
FIG. 8 illustrates an example of a wide area and a readout region for panning, tilting, and zooming (PTZ).

FIG. 8 illustrates an example of a wide area and a readout region for panning, tilting, and zooming (PTZ). A video corresponding to the wide-area imaging camera can be obtained by capturing an image of a person 801 with an area 802. Moreover, in the case of obtaining a video corresponding to the PTZ imaging camera, the imaging target selection unit 208 and the resolution change unit 206 issue an instruction indicating a area 803 to be enlarged. The resolution conversion unit 703 can read out image sensor pixels corresponding to the area 803 to be enlarged, in an amount of thinning-out smaller than that in the entire area.

According to the above-described exemplary embodiments, an increase in processing load and an increase in the total amount of used memory can be prevented, and feature amounts effective in discriminating respective objects can also be obtained.

Other Embodiments

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random access memory (RAM), a read-only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of priority from Japanese Patent Application No. 2015-204049 filed Oct. 15, 2015, which is hereby incorporated by reference herein in its entirety.

What is claimed is:

1. An image processing apparatus comprising:
a first imaging unit configured to capture a wide-area image;
a second imaging unit configured to capture a partial image corresponding to a part of the wide-area image;
one or more memories storing instructions; and
one or more processors that, when executing the instructions, causes the image processing apparatus to:
extract a feature amount in each image region of a plurality of objects from the captured images;
determine, based on the extracted feature amount, a type of a feature amount used for discriminating each of the plurality of objects and a resolution of an image used for extracting a feature amount of the determined type;
control the imaging units to output an image at the determined resolution;
detect image regions of the plurality of objects from the wide-area image captured by the first imaging unit; and
control the extraction unit to extract a feature amount of the determined type in each image region of the plurality of objects output at the determined resolution from the partial image captured by the second imaging unit.

2. The image processing apparatus according to claim 1, wherein the one or more processors further causes the image processing apparatus to:
store data of the wide-area image captured by the first imaging unit; and
store information on the feature amounts extracted from the respective image regions of the plurality of objects in association with the respective image regions in the wide-area image.

3. The image processing apparatus according to claim 2, wherein the one or more processors further causes the image processing apparatus to:
acquire a query image for search and to extract a feature amount from the query image;
search for a feature amount similar to the feature amount extracted from the query image from among the stored feature amounts stored; and
search for an image including an image region of an object associated with the searched feature amount from among stored images.

4. The image processing apparatus according to claim 3, wherein the one or more processors
extracts all types of feature amounts acquirable from the query image;
reads out feature amounts corresponding to all of the types of feature amounts acquired from the query image from among the stored feature amounts; and
searches for a feature amount a distance between which and each feature amount extracted from the query image is within a threshold value in the stored feature amounts, as a feature amount similar to the feature amount extracted from the query image.

5. The image processing apparatus according to claim 3, wherein the one or more processors reduces or enlarges the query image, and extracts all types of feature amounts acquirable from the reduced or enlarged query image.

6. The image processing apparatus according to claim 1, wherein the one or more processors performs clustering on the feature amounts extracted from the image regions of the plurality of objects in the partial image captured by the second imaging unit, and determines the type of a feature amount and the resolution based on a result of the clustering.

7. The image processing apparatus according to claim 6, wherein, if a number of feature amounts included in at least one class obtained by the clustering is greater than a predetermined threshold value, the one or more processors determines the type of a feature amount as a type corresponding to a more high-resolution image, and
causes the second imaging unit to output an image at a high resolution corresponding to the determined type of a feature amount.

8. The image processing apparatus according to claim 6, wherein the one or more processors determines the type of a feature amount as a type corresponding to a more high-resolution image with respect to an object from which a feature amount of a type belonging to a class a number of feature amounts included in which is greater than a predetermined threshold value in classes obtained by the clustering is extracted, and controls the second imaging unit to output an image at a high resolution corresponding to the determined type of a feature amount.

9. The image processing apparatus according to claim 1, wherein the second imaging unit includes a zoom lens, and
wherein the one or more processors controls the zoom lens of the second imaging unit to output an image at the determined resolution.

10. The image processing apparatus according to claim 1, wherein the second imaging unit includes a pixel interpolation unit configured to interpolate pixels of the captured images, and
wherein the one or more processors controls the second imaging unit to output an image at the determined resolution by causing the pixel interpolation unit to interpolate the pixels.

11. An image processing method comprising:
capturing a wide-area image using a first imaging unit;
capturing a partial image corresponding to a part of the wide-area image using a second imaging unit;
extracting a feature amount in each image region of a plurality of objects from the captured images;
determining, based on the extracted feature amount, a type of a feature amount used for discriminating each of the plurality of objects and a resolution of an image used for extracting a feature amount of the determined type;
controlling the imaging units to output an image at the determined resolution;
detecting image regions of the plurality of objects from the wide-area image captured by the first imaging unit; and
extracting a feature amount of the determined type in each image region of the plurality of objects output at the determined resolution from the partial image captured by the second imaging unit.

12. A non-transitory computer-readable storage medium storing computer-executable instructions that, when executed by a computer, cause the computer to perform a method comprising:
capturing a wide-area image using a first imaging unit;
capturing a partial image corresponding to a part of the wide-area image using a second imaging unit;
extracting a feature amount in each image region of a plurality of objects from the captured images;
determining, based on the extracted feature amount, a type of a feature amount used for discriminating each of the plurality of objects and a resolution of an image used for extracting a feature amount of the determined type;
controlling the imaging units to output an image at the determined resolution;
detecting image regions of the plurality of objects from the wide-area image captured by the first imaging unit; and
extracting a feature amount of the determined type in each image region of the plurality of objects output at the determined resolution from the partial image captured by the second imaging unit.

* * * * *